July 15, 1952  J. E. SHRIVER  2,603,113
MACHINE TOOL
Filed Sept. 17, 1947  7 Sheets-Sheet 1

INVENTOR.
JOHN E. SHRIVER
BY
Joseph A. Rave
Atty.

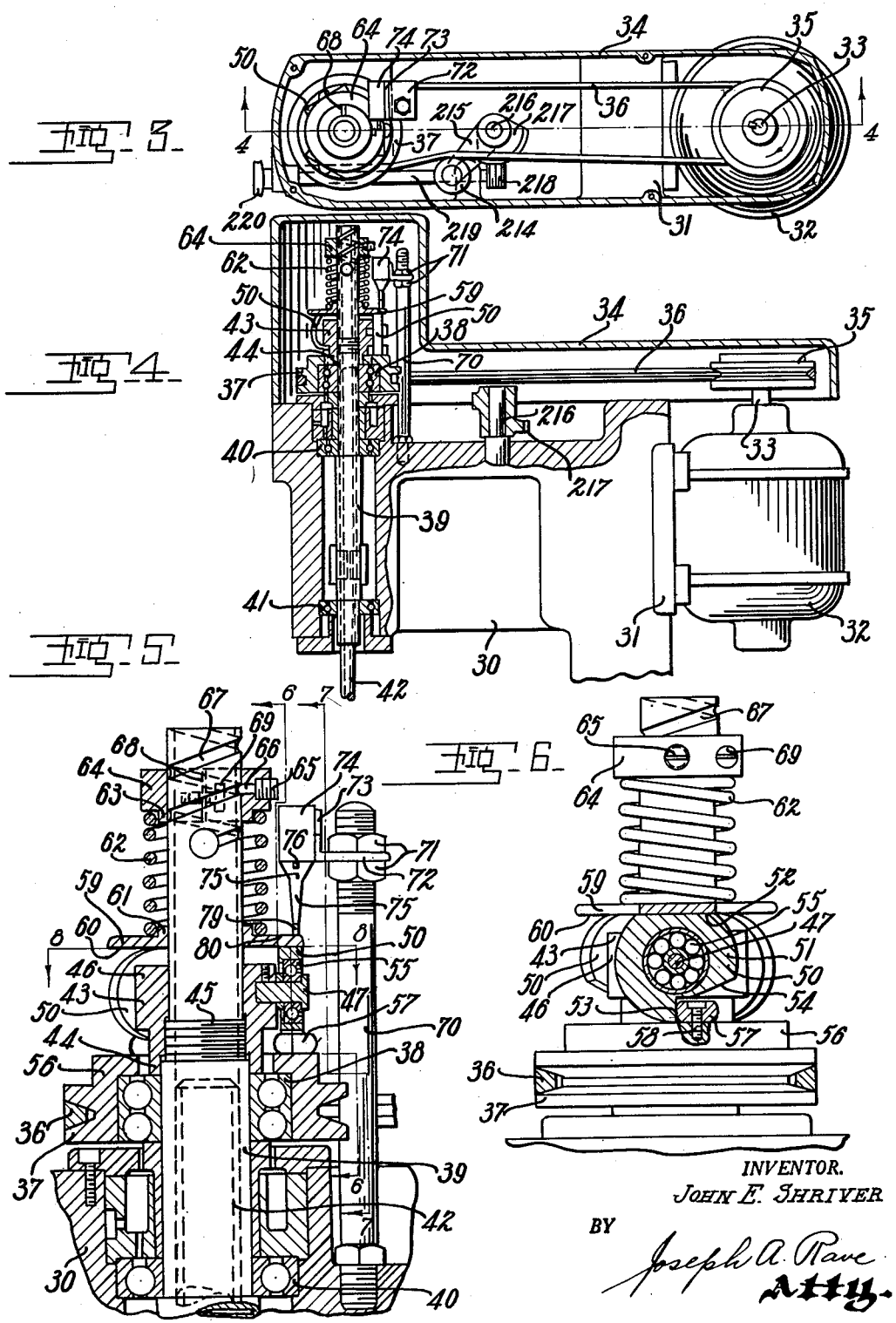

July 15, 1952     J. E. SHRIVER     2,603,113
MACHINE TOOL
Filed Sept. 17, 1947     7 Sheets-Sheet 3
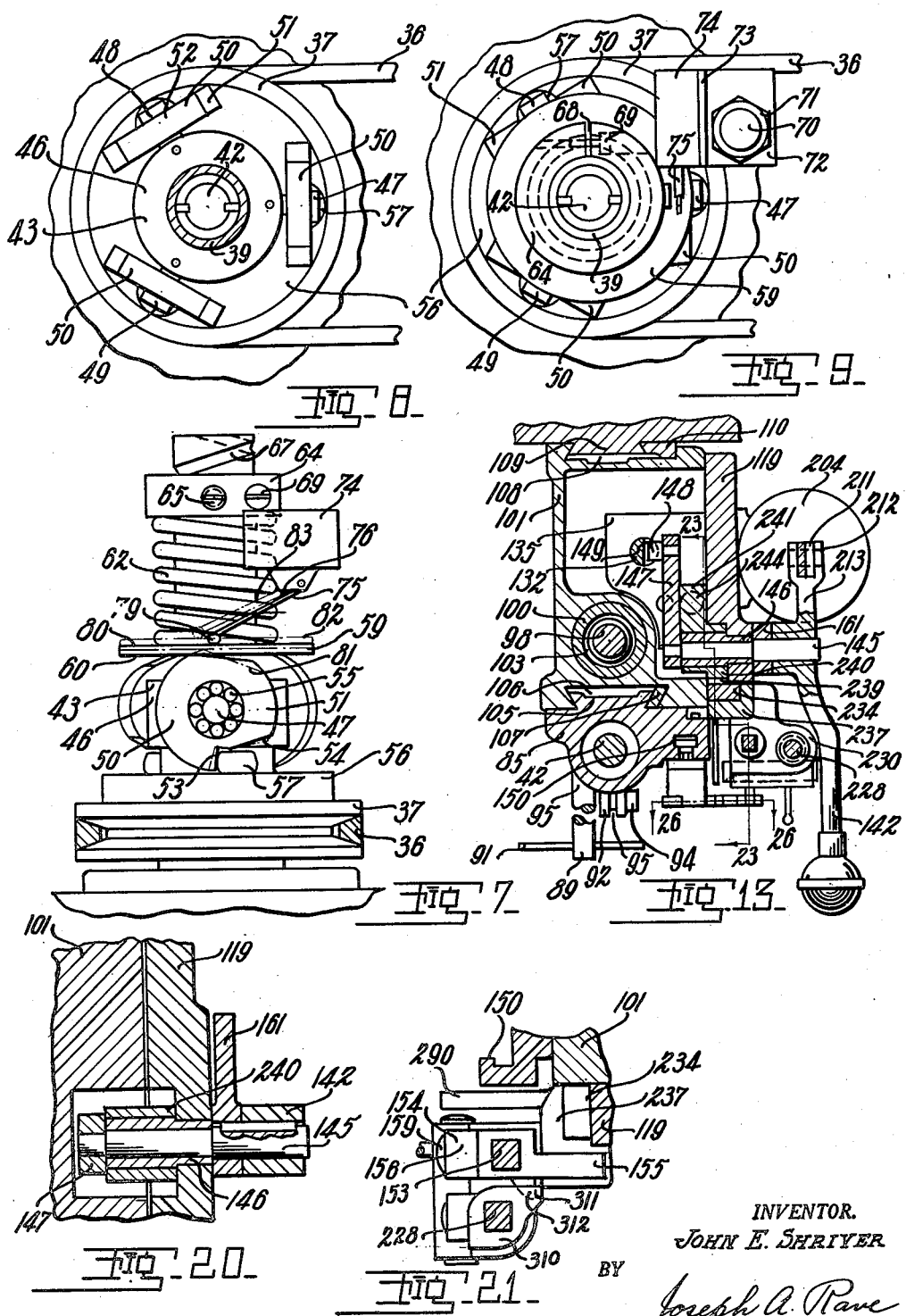
INVENTOR.
JOHN E. SHRIVER
BY
Joseph A. Rave
Atty.

July 15, 1952  J. E. SHRIVER  2,603,113
MACHINE TOOL
Filed Sept. 17, 1947  7 Sheets-Sheet 4
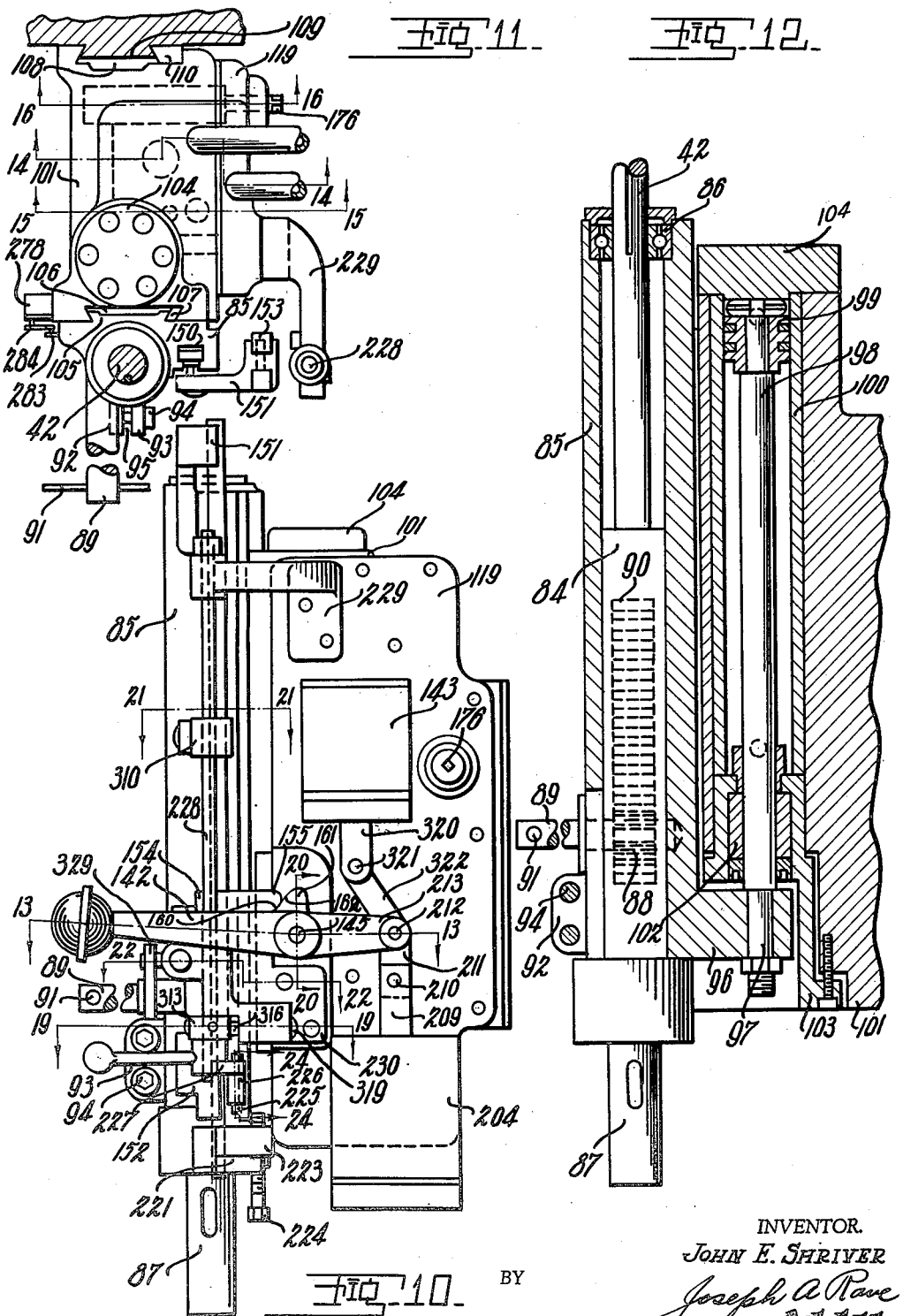
INVENTOR.
JOHN E. SHRIVER
BY Joseph A. Rase
Atty.

July 15, 1952　　　　　J. E. SHRIVER　　　　　2,603,113
MACHINE TOOL
Filed Sept. 17, 1947　　　　　　　　　　　7 Sheets-Sheet 5
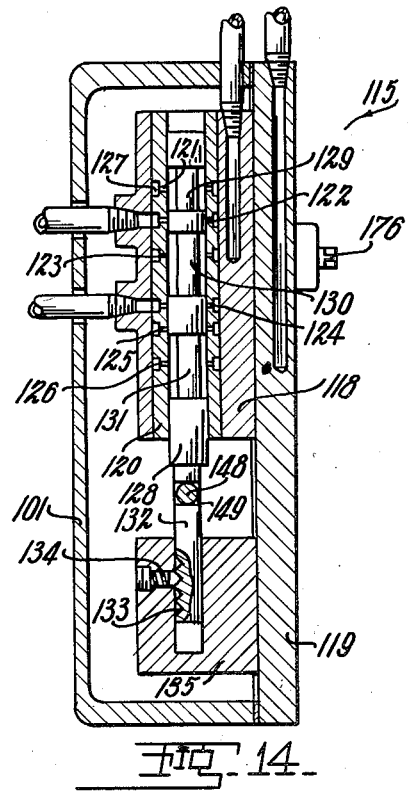
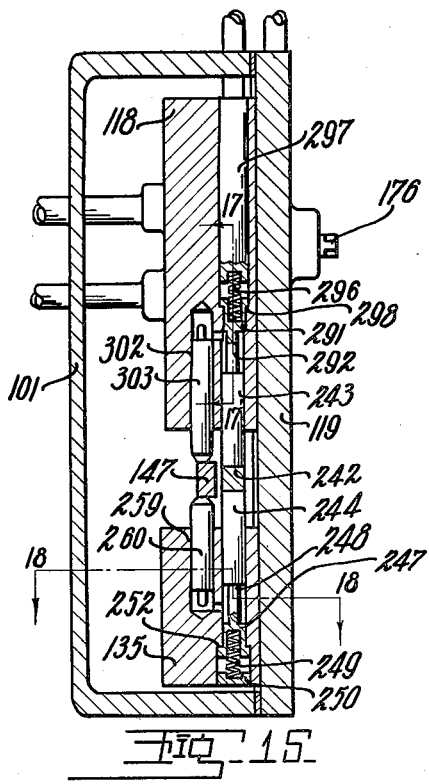
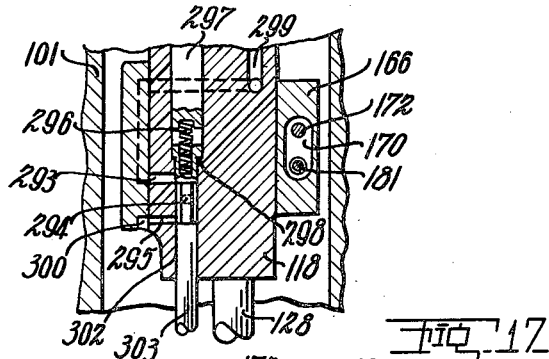
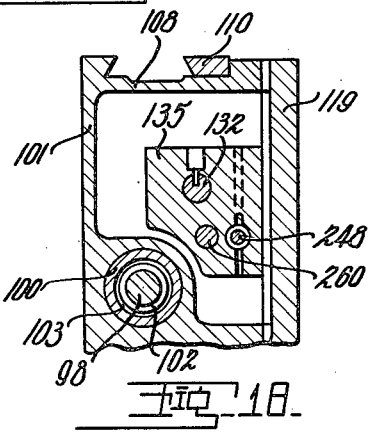
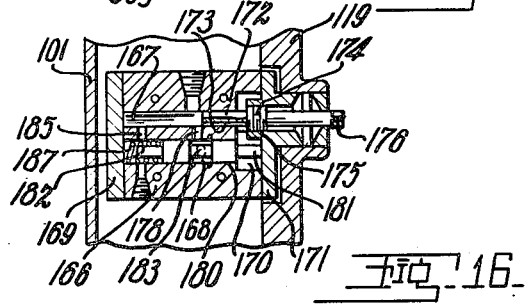
INVENTOR.
JOHN E. SHRIVER
BY
Joseph E. Rave
Atty.

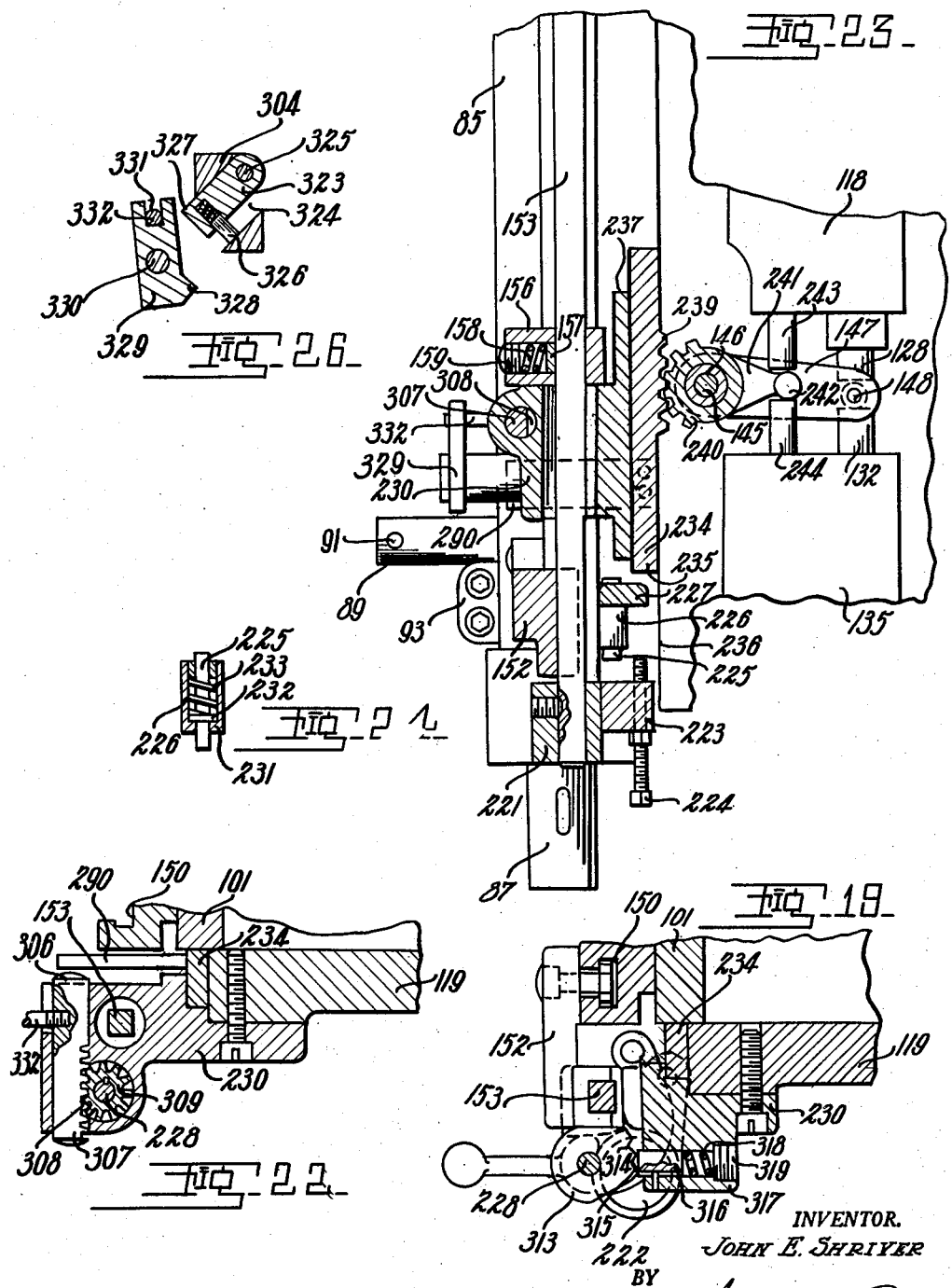

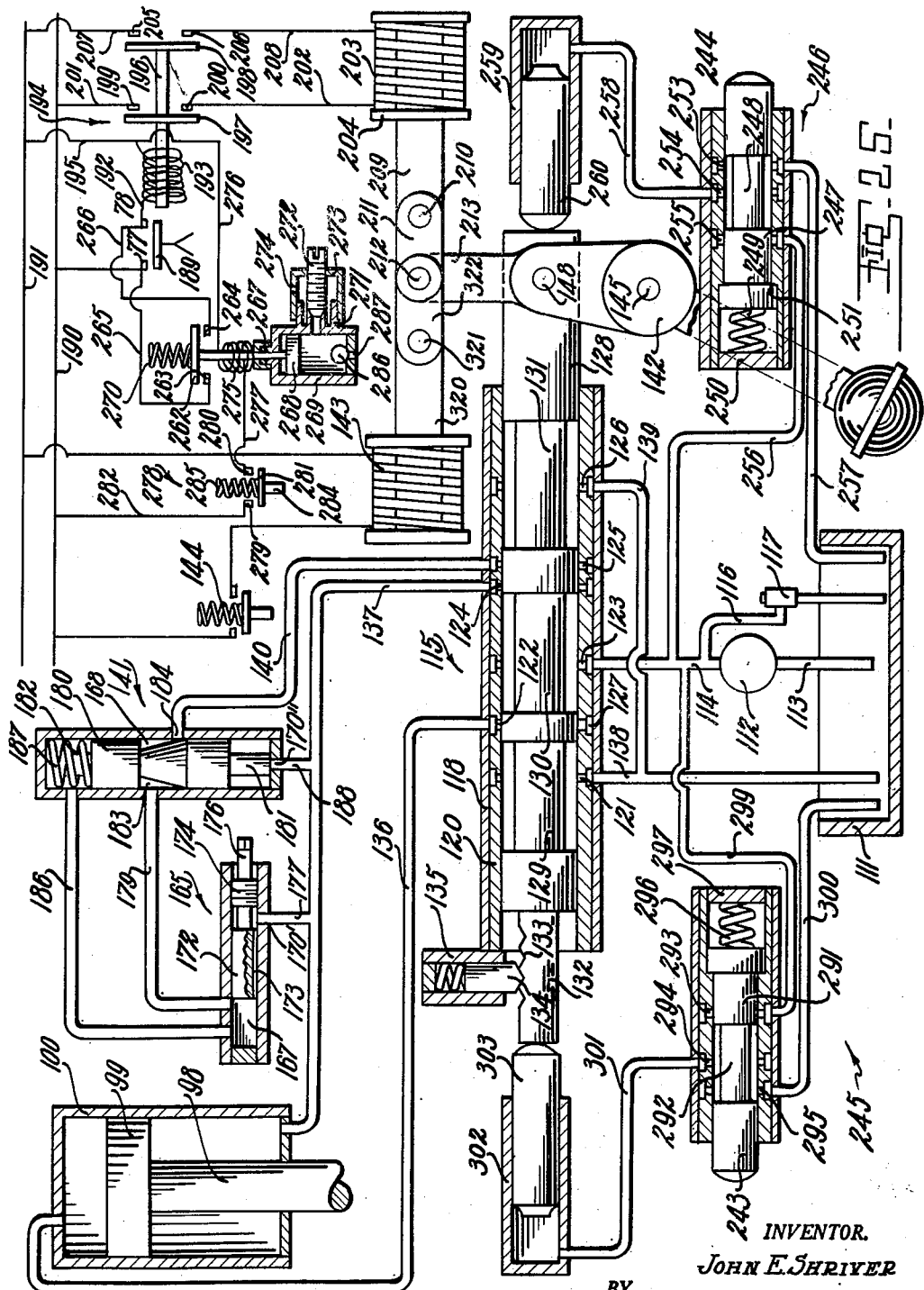

Patented July 15, 1952

2,603,113

UNITED STATES PATENT OFFICE 2,603,113

MACHINE TOOL

John E. Shriver, Fort Mitchell, Ky., assignor to The Avey Drilling Machine Company, Covington, Ky., a corporation of Ohio Application September 17, 1947, Serial No. 774,482

6 Claims. (Cl. 77—32.4)

This invention relates to improvements in machine tools and particularly to improvements in high speed or sensitive drills.

This invention relates to improvements and augments the disclosure in the application for patent of Edward J. Busemeyer for Machine Tools filed September 30, 1946, under Serial No. 700,223, now Patent No. 2,562,170, issued July 31, 1951.

The machine of the present invention is intended for performing deep hole drilling operations or for performing step drilling operations. By step drilling operations is meant the drilling of long or deep holes by increments or a series of short drilling operations until the hole is completely drilled and usually is done with small diameter drills or tools. As is well known the purpose for this step drilling is to prevent drill breakage caused by resistance to drill rotation due to accumulation of chips in the hole being drilled and other interference with proper drill cutting.

As disclosed in the above identified application of Edward J. Busemeyer use is made of a torque control so set as to withdraw the drill from the hole when resistance to rotation reaches a point just below the safe torque point of the drill. It has been found that the torque control while extremely sensitive to drill feed and rotation sometimes permitted the drill to remain in the hole for too long a period of time without being cooled, and which cooling can only be done by withdrawing the drill from the hole, that the drill becomes overheated to the point of having its drilling edge burnt. By the mechanism disclosed herein this difficulty has been overcome.

It is therefore, the principal object of the present invention to provide a high speed or sensitive drilling machine wherein the drill or tool is retracted from the hole when the torque thereon becomes dangerous and at the same time to withdraw the drill from the hole independently of the torque thereon for drill cooling purposes.

Another object of the present invention is the provision of a high speed or sensitive drilling machine for drilling deep holes in which means are incorporated for withdrawing the drill after definite time intervals, which time intervals can be adjusted depending upon the speed of the drill, the rate of the drill cutting, and the nature of the material being drilled.

Another object of the present invention is the provision of a high speed or sensitive drilling machine for drilling deep holes in which the drill or tool is withdrawn each time the torque on the drill reaches an unsafe point and in which additional means are provided for withdrawing the drill or tool from the hole without regard to the torque thereon for the purpose of cooling the drill and in which these devices are so related to one another that their functions do not overlap for unnecessarily withdrawing the drill or tool from the work.

It is also an object of this invention to provide a deep hole drilling machine in which the drill or tool is withdrawn from the hole after definite time intervals together with means for resetting the time intervals in the event the drill or tool is withdrawn by means other than the time interval withdrawing means.

It is also an object of this invention to provide a high speed or sensitive drilling machine that can be economically produced and acquired keeping in mind the necessary complexity required in a machine for obtaining the foregoing objects.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 3 is a horizontal sectional view through the machine as seen from line 3—3 on Fig. 2.

Fig. 4 is a fragmentary sectional view through the upper end of the machine taken on line 4—4 on Fig. 3.

Fig. 5 is an enlarged sectional view of a portion of Fig. 4 and particularly illustrating the spindle driving mechanism.

Fig. 6 is a fragmentary elevational view, partly in section, of a portion of Fig. 5 as seen particularly from line 6—6 on said Fig. 5.

Fig. 7 is an elevational view of a portion of Fig. 5 as seen from a plane to the right of that of Fig. 6 on line 7—7 on said Fig. 5.

Fig. 8 is a fragmentary horizontal sectional view through the spindle drive mechanism taken on line 8—8 on Fig. 5.

Fig. 9 is a top plan view of the spindle drive mechanism with the parts in the position illustrated in Figs. 5, 6 and 7.

Fig. 10 is a side elevation, on an enlarged scale, of the spindle head in which is disposed the control mechanism.

Fig. 11 is a top plan view of the spindle head of Fig. 10.

Fig. 12 is an enlarged fragmentary vertical sectional view through the spindle and its moving piston as seen from line 12—12 on Fig. 1.

Fig. 13 is a transverse sectional view through the spindle head taken on line 13—13 on Fig. 10.

Fig. 14 is a transverse vertical sectional view through the spindle head as seen from line 14—14 on Fig. 11.

Fig. 15 is a transverse sectional view through a plane forwardly of that of Fig. 14 on line 15—15 on Fig. 11.

Fig. 16 is a fragmentary vertical sectional view through the spindle head taken in a plane behind that of Fig. 14 on line 16—16 on Fig. 11.

Fig. 17 is a fragmentary vertical sectional view through a part of the control mechanism taken on line 17—17 on Fig. 15.

Fig. 18 is a fragmentary transverse sectional view through a part of the control mechanism on line 18—18 on Fig. 15.

Fig. 19 is a fragmentary transverse sectional view through the control mechanism on line 19—19 on Fig. 10.

Fig. 20 is a fragmentary vertical sectional view through the control mechanism taken on line 20—20 on Fig. 10.

Fig. 21 is a fragmentary transverse sectional view through a portion of the control dog mechanism taken on line 21—21 on Fig. 10.

Fig. 22 is a fragmentary sectional view through the dog rod control mechanism taken on line 22—22 on Fig. 10.

Fig. 23 is an enlarged fragmentary vertical sectional view through the control valve operating mechanism as seen from line 23—23 on Fig. 13.

Fig. 24 is an enlarged vertical sectional view through a valve shift pin as seen from line 24—24 on Fig. 10 and disclosing a detail of the invention.

Fig. 25 is a diagrammatic view depicting the complete hydraulic and electric circuits utilized in effecting and controlling the movement of the spindle carrier.

Fig. 26 is an enlarged sectional view through one of the control dogs as seen from line 26—26 on Fig. 13.

Throughout the several views of the drawings similar reference characters are employed to denote the same or similar parts.

Figures 1, 2:
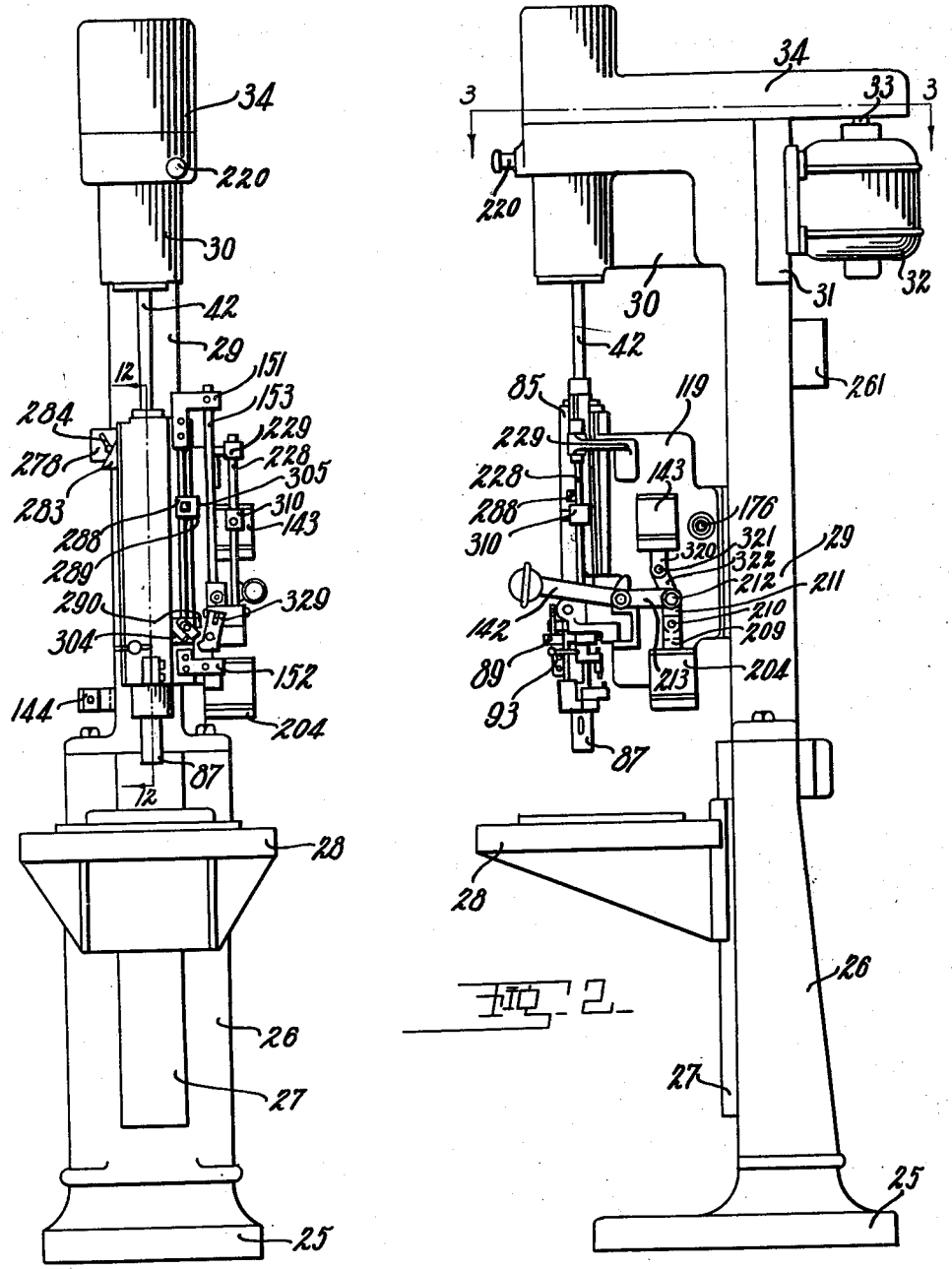
Fig. 1 is a front elevational view of a drilling machine embodying therein the improvements of the present invention.
Fig. 2 is a side elevational view of the machine of Fig. 1 as seen particularly from the right hand side thereof.

The present invention is disclosed in this application as a single spindle machine but it is to be understood that a machine embodying the present invention may include a plurality of spindles with each spindle being independently operated and controlled. Furthermore, the spindle is disclosed in this application as operating about a vertical axis but it is to be understood that the spindle may be operated along a horizontal axis or an axis at any angle between the vertical and horizontal and which is generally the situation when a multiple spindle machine is produced. In other words a multiple spindle machine might have each spindle axis at a different angle from the other depending upon the number of holes to be bored and their axial relation to one another as would be the case in drilling, for example, the oil holes in a multi-cylinder engine crank shaft.

As was noted above, this invention pertains primarily to means or mechanism for controlling the longitudinal or feed movement of a drill for performing step or deep hole drilling operation. In the embodiment of the invention herein disclosed there is provided a machine in which the tool or drill is advanced from an initial position at a rapid rate to the work, fed at a slow rate through a part of the work and then, after a definite time interval or when the torque on the drill becomes excessive, retracted, followed by a rapid advance of the drill or tool to the point where it was previously withdrawn for a second drilling step whereupon reversal may again take place. This cycle of operation is repeated until the work is completely tooled or drilled. As was noted above, the purpose of this type of a control mechanism is to permit the clearing of chips from the holes so that they do not interfere with the rotation or operation of the drill or interfere or prevent maintaining the drill in a cool condition. In the case of drilling oil holes in crank shafts, this is very important since such drills are of comparatively small diameter and will not stand a great amount of strain. In this instance, the chips may interfere with the rotation of the drill, thereby setting up a torque on the drill in excess to that which it will stand, causing said drills to be twisted and broken, or if torque alone is depended upon the drill may remain in the hole and burn.

By the present invention, means are provided whereby this torque is utilized for effecting the withdrawal of the drill from the hole. At the same time, these chips may not increase the torque on the drill but might interfere with the proper feeding of the drill, thereby causing same to become excessively hot, and means are therefore provided supplementary to the torque control means for periodically withdrawing the drill from the hole, that is, after a definite amount of time of drilling, to provide for cooling of the drill.

Specifically, the machine shown in the drawings comprises a base 25, from which rises a standard 26 having formed vertically of its front face a dovetail guide 27 having mounted thereon a work supporting table 28. Any suitable means (not shown) may be provided for adjusting the work table 28 relative to the guide 27 and for clamping the table in position. Mounted on the upper end of the standard 26 is a column 29 terminating at its upper end in a housing 30 for the spindle bearings and like mechanism.

The column 29, at its upper rear end, is provided with a pad 31 to which is secured a motor 32. Projecting from the motor 32 is the motor shaft 33 which projects into a hollow cover cap 34 secured to the housing 30. The motor shaft 33 has keyed or otherwise secured to it a pulley 35 for a belt 36. The belt 36 is in turn extended around the spindle pulley 37, freely rotatable on anti-friction bearings 38 which encircle the spindle driving sleeve 39. The spindle driving sleeve 39 is journaled in anti-friction bearings 40 and 41 and is provided interiorly thereof with suitable driving keys which enter splines in a spindle 42.

The spindle pulley 37 is substantially cup shaped and encloses the anti-friction bearing 38. The inner race of the bearing 38 is placed under tension by a nut 43 which has its sleeve-like portion 44 in contact with said inner race of anti-friction bearing 38. The nut 43 is connected with the spindle sleeve 39 through threads 45. The nut 43 includes an enlarged portion 46 which carries the driving means between the pulley 37 and spindle sleeve. As seen most clearly from Fig. 8 the nut portion 46 has projecting, radially, from equally spaced points around its periphery, three being shown, studs 47, 48 and 49 on each of which is mounted a driving cam or dog 50. Each of said cams or dogs 50 is substantially identical which, as seen in Figs. 5, 6 and 7 comprises a cylindrical member or roller 51 having at one point on its periphery a flat 52. Diametrically opposite the flat 52 the cam or dog is provided with a vertical shoulder or face 53 which terminates in an upwardly and outwardly inclining cam face 54. The dog is mounted on its stud 47, 48 or 49 through an anti-friction bearing 55.

Projecting upwardly from the hub 56 of the spindle pulley 37 is an abutment 57 in the nature of a roller secured to the pulley 37 through a threaded stud 58. There are as many abutments 57 as dogs 50. Each abutment 57 is positioned on the pulley 37 to be engaged by the vertical shoulder or face 53 of its cam or dog roller 51.

Surrounding the spindle driving sleeve 39 is a plate 59 having its under surface 60 simultaneously resting on the flats 52 of each of the cams or dog 50. Upstanding from the plate 59 is a short sleeve 61 which acts as a centralizing medium for a coiled spring 62 above the plate 59. The other end of the spring 62 is likewise centralized by a short sleeve 63 projecting downwardly from a nut 64 on the spindle sleeve 39.

The spring tensioning nut 64 is provided with a screw 65 having projecting therefrom a pin-like portion 66 that enters the screw thread or spiral path 67 in the upper end of the spindle sleeve 39. The screw thread or spiral path 67 has a large lead whereby the nut may be rapidly advanced longitudinally of the spindle driving sleeve. The nut 64 is adapted to be actuated to the desired position and then secured in this position for which purpose it is split as at 68, see Fig. 9, having the split spanned by a suitable clamping screw 69.

Upstanding from the housing 30 is a post 70 having secured to its upper end, as by nuts 71, an angle bracket 72. The one leg 73 of the angle bracket 72 has secured to it an electric switch 74 which has pivoted thereto one end of an arm 75. Projecting from the arm 75 is a plunger 76 to actuate the switch contacts within the electric switch, not shown except diagonally in Fig. 25 where they are indicated by the reference numerals 77 and 78. The other end of the arm 75 is provided with a roller 79 which rides on the upper surface 80 of the plate 59 as clearly illustrated in Figs. 5 and 7.

The motor 32 rotates in a clockwise direction as indicated by the arrow thereon in Fig. 3 which through the belt 36 correspondingly rotates the spindle sleeve pulley 37 in a clockwise direction is to the left as seen in Figs. 5, 6 and 7 wherefore the abutments 57, from said pulley 37, will each engage its driven cam or dog 50 through its shoulder or vertical face 53 to correspondingly rotate the nut 43 and thereby the spindle sleeve 39. The position of the parts illustrated in Figs. 5 and 6 is the normal or idle position and upon initial rotation of the spindle sleeve pulley 37 the cams or dogs 50 are slightly rotated about their individual studs 47, 48 and 49 to the position shown in solid lines in Fig. 7. In other words the flats 52 of each cam or dog 50 are slightly tilted from the horizontal to a downwardly inclined position as seen in Fig. 7 in solid lines which causes a slight compression in the spring 62. It is in this position of the parts that the spindle is being rotated during a drilling operation. The parts will be held in this position so long as the drill is freely cutting and has no torque or sticking pressure thereon greater than that which can be withstood by the drill.

Should, for some reason, the torque on the drill be increased due to a gathering of the chips in the hole being drilled or a swelling of the drill due to friction heat or for any other reason a resistance be set up to drill rotation, the driving spindle sleeve will tend to slow down in its rotation thereby tending to correspondingly slow down the rotation of the spindle sleeve pulley 37. Since the said spindle sleeve pulley is being constantly driven through the belt 36 the abutments 57 will constantly turn and will thereby cause the cams or dogs 50 to be rotated or oscillated about their studs 47, 48, and 49 from the solid line position of Fig. 7 to the phantom line position 81 thereof and will thereby raise the plate 59 from its solid line position in Fig. 7 to its phantom line position, indicated by the reference numberal 82, and correspondingly elevate the switch arm 75 from its solid line position to its phantom line position 83. This immediately closes the contacts 77 and 78 of the switch to operate the control mechanism, to be later described, and withdraw the drill from the work.

It has been found in actual tests that this control is an extremely accurate and sensitive one. For example use was made of a one-eighth inch drill rotating at 2750 R. P. M. and that in a maximum of ten revolutions of the drill the withdrawal took place. This withdrawal was effected in five one hundredths (.05) of a second, the total time required to actuate the switch 74 and effect the said drill withdrawal. The break down of this time included twelve thousandths (.012) of a second switch operation and twenty-nine thousandths (.029) of a second for solenoid operation, to be later described.

It is to be understood, of course, that this time may be varied depending upon the size of the drill and the materials being used and which variation is accomplished by adjusting the nut 64 to increase or decrease the tension in the spring 62, all as pointed out above.

From the foregoing it will now be appreciated that there has been provided a yieldable drive connection between a source of power and the spindle and which drive connection yields to excessive pressure on the drill due to an increase in torque thereon. It will further be appreciated that by adjusting the tension or yielding limit in this yieldable drive the point of drill breakage can be utilized so that the drill is withdrawn in ample time to prevent the occurrence of drill breakage. It will further be appreciated that a high speed or sensitive drilling machine equipped with the yieldable drive just described will perform drilling operations of the deep hole drilling type and the actual drilling performed until the point of breakage of the drill is nearly reached instead of withdrawing the drill when no danger exists.

The spindle 42 is mounted for rotation, at its lower end, in a quill 84, disposed for axial adjustment in a bore in a tool carrier 85, see Fig. 12. The upper end of the tool carrier 85 carries an anti-friction bearing 86 for the spindle 42. The lower extremity of the spindle 42 is provided with the usual chuck 87 for the drill or other tool.

The spindle 42 is axially adjustable relative to the carrier 85 by means of a rack pinion 88 carried by a shaft 89 rotatably journaled in the carrier 85. The rack pinion 88 meshes with a rack 90 formed integral with or secured to the quill 84. In order to rotate the pinion 88, its shaft 89 projects beyond the forward side of the carrier 85 and has secured thereto a handle or the like 91. The lower end of the carrier is split and on each side thereof is a lug or ear 92 and 93, see Fig. 13, respectively provided with a tapped and a plane perforation receiving a clamping stud 94. This clamping stud draws the portions of the carrier on each side of the split 95 toward one another and thereby clamps the quill in adjusted positions.

The spindle carrier, and therefore the parts carried thereby, are actuated by hydraulic means toward and from the work, which means, as shown in Fig. 12, comprises a rearwardly projecting lug 96 on the carrier 85 which has a perforation therein receiving the lower reduced end 97 of a piston rod 98. The piston rod 98 has secured to its upper end a piston 99 which is movable through a cylinder 100 secured in a bore in the spindle head 101.

In order to prevent loss of fluid and pressure around the piston rod at its lower end, use is made of a suitably packed joint 102 carried by the lower cylinder head 103. The upper end of the cylinder 100 is likewise suitably closed by a head 104.

The spindle carrier 85 is guided in its movement relative to the spindle head 101, see Fig. 11, by means of a dove-tailed guide 105 received in a correspondingly shaped guide-way 106 with a gib 107 between one side of the guide and the adjacent side of the guide-way. The tool head 101 is provided in its rear side with a dove-tailed guide-way 108 receiving a correspondingly shaped guide 109 formed on the forward face of the column 29. A gib 110 is disposed in the guide-way 108 between one side of the guide tongue 109 and the opposed side of said guide-way 108 for clamping the head in position on the said column 29.

As was noted above, hydraulic or fluid means is preferably employed for actuating the piston 99, and therefore the spindle carrier, toward and from the work. This hydraulic mechanism is shown diagrammatically in Fig. 25 to which reference is now to be had, and the various valves and control means will be described in detail with reference to their structural illustrations in the other figures of the drawings as they are encountered in a complete cycle of operation of the machine. As shown in Fig. 25, use is made of a tank or sump 111, which may be independent of the machine though preferably is formed in some part of the bed, such as in the base 25 and lower portion of the standard 26. Mounted above the tank or sump 111 is a constantly rotating pressure circulating pump 112 having its intake or suction side connected by a pipe 113 with the sump or tank. The discharge side of the pump has extending therefrom the pressure pipe or conduit 114, terminating in the main control mechanism indicated in general in Fig. 25 by the reference numeral 115. The pressure pipe or conduit 114 has connected therewith a branch pipe or conduit 116 which terminates in the sump or tank 111, and has intermediate its ends an adjustable relief valve 117. The relief valve 117 determines the actuating pressure in the system.

The main control valve 115 is structurally illustrated in Fig. 14 and comprises a valve block 118 secured to the inner face of a spindle head plate 119 which closes the open right hand end of the spindle head 101, as seen in Figs. 1 and 14. Pressed into a suitable bore in the valve block 118 is a valve sleeve 120 having formed therethrough and radially thereof a plurality of sets of radial ports 121, 122, 123, 124, 125 and 126, each set of ports being encircled by a similar groove 127 formed circumferentially in the exterior of the sleeve 120. Disposed in the bore of the valve sleeve 120 is a spool type valve member 128 provided with reduced portions or cannelures 129, 130 and 131 adapted in different positions of adjustment to variously connect the several sets of ports in the valve sleeve 120.

The valve 128 has four operative positions, and in order to determine these positions, it has projecting therefrom a stem 132 provided with four V-shaped notches 133 co-operating with a spring pressed detent 134 carried by a valve block 135. The valve block 135, similar to the valve block 118, is secured to the inner face of the plate 119, and therefore projects into the interior of the spindle head 101. The position of the valve illustrated in the drawings is the neutral or stop position, and the valve has a position to the right of that shown in Fig. 25, or below that shown in Fig. 14, which is the retracting position. A third position of the valve 128 is to the left of that shown in Fig. 26 and upwardly of that shown in Fig. 14, which is the slow feed position to cause the tool to feed slowly through the work while a cut is being effected. The fourth position of the valve is to the extreme left in Fig. 25, and extreme upper position in Fig. 14, which is the rapid downward position to cause a rapid approach of the tool to the work. As was noted above each of these positions is determined by a notch 133 in the valve stem 132 that co-operates with the spring pressed detent 134.

As seen in Fig. 25, the radial ports 122 and 124 of the valve 115 have respectively connected with them one end of pipes or conduits 136 and 137 which respectively terminate at ports located at upper and lower ends of the piston cylinder 100. The ports 123 have connected therewith the upper end of the main pressure pipe or conduit 114, while the ports 121 and 126 have connected therewith pipes or conduits 138 and 139 which terminate in the sump or tank 111, and are, therefore, the return lines for the system from the main control valve mechanism. The remaining set of ports 125 of the piston valve sleeve 120 have connected therewith one end of a pipe or conduit 140 which terminates in a balance valve mechanism, indicated in general in Fig. 25 by the reference numeral 141, and which will be described in detail later.

At the commencement of a tooling cycle, the valve 128 is manually shifted by means of a lever 142, see Fig. 13, or is shifted by a solenoid 143 under control of a switch 144, see Figs. 1, 2 and 25. The lever 142 is keyed or otherwise secured to the outer projecting end of a shaft 145 oscillatably journaled in a bushing 146 carried by the spindle head cover plate 119. The inner, projecting end of the shaft 145 has keyed or otherwise secured to it a lever 147 having at its free end a valve shifting pin 148 received in a slot 149 formed in the valve stem 132. This initial shifting of the valve member 129 is to the extreme left in Fig. 25 and extreme upper position in Fig. 14 for thereby connecting the pressure ports 123 with the ports 122 and causing a flow of fluid from the conduit 114 to the conduit 136, and therefore the upper end of the cylinder 100 for actuating the piston 99 downwardly together with the parts connected therewith. The fluid beneath the piston 99 is at this time being exhausted by way of pipe or conduit 137 to the ports 124 and 126 and to the pipes or conduits 139 and 138 to the sump or tank 111. As was noted above, this movement of the piston and parts connected therewith is at a rapid rate in a downward direction or toward the work.

The rapid downward or advancing movement of the carrier 85 is provided therein with a T-shaped slot 150, see Fig. 11 which extends the length of the carrier and has secured therein at its upper end a bracket or arm 151, and at its lower end a bracket or arm 152, see Fig. 19. Carried by the brackets or arms 151 and 152 is a rod or bar 153, shown in the drawings as of angular cross section. Mounted on this rod is the cumulative rapid traverse stop dog 154 which, as seen in Fig. 10, is provided with a cam shaped nose 155 on one side of the rod 153, and as seen in Fig. 23 with a cylindrical boss 156 on the other side of said rod 153. The boss 156 is hollow to accommodate a friction shoe 157 backed up by a spring 158 whose tension may be adjusted by screw 159. The cam nose 155 provides an inclined cam face 160 for engagement with a flipper dog 161. The flipper dog 161, as seen in Figs. 10 and 20, is keyed or otherwise secured to the outer end of the stud or shaft 145 between the lever 147 and face or head cover plate 119. The flipper dog 161 is provided on one side with a cam face 162 that cooperates with the cumulative stop dog nose cam face 160.

From this, it should be seen that the cumulative rapid traverse stop dog 154 is adjustably positioned on the rod 153 to engage the flipper dog 161 at the point where the drill or tool is about to engage the work. The oscillation of the flipper dog 161 in a clockwise direction, as seen in Fig. 10, actuates the lever correspondingly or in a clockwise direction, and at the same time through the shaft or stud 145 and arm 147, shifts the valve member 129 to a position for cutting off the flow of the exhaust fluid through the pipe or conduit 137 and therefore the unrestricted port 124. This flow is directed, instead, from the pipe or conduit 137 to the feed rate determining valve, indicated in general in Fig. 25, by the reference numeral 165.

This feed rate determining valve 165 is shown structurally in Fig. 16, and comprises a valve block 166 secured to the rear side or end of valve block 118, as shown in dotted lines in Fig. 11. The valve block 166 is provided therethrough with a pair of bores 167 and 168, one end of each of which is closed by a plate 169, while the other ends are in communication with a chamber 170. This chamber 170 is in turn closed by a plate 171 secured to the block 166. Disposed in the valve block bore 167 is a valve member 172 having an inclined groove 173 formed longitudinally in one side thereof. The valve member 172 is provided adjacent one end of its groove with an enlarged threaded portion 174 threaded into an aperture 175 formed through the closure plate 171. Projecting from the threaded portion 174 is the valve stem 176, having its end provided with a portion to receive a suitable wrench, key, or the like, whereby the valve may be turned to effect its adjustment through its enlarged threaded portion 174.

The most shallow portion of the groove 173 is adjacent to the chamber 170 and establishes the minimum rate of flow from this chamber. From this, it will be seen, that the greater the depth of the groove 173 that is in communication with the chamber 170, the faster the flow from this chamber, and that the position of this groove with respect to the chamber 170 is determined by the adjustment of the threaded portion 174 on the valve stem 172 and therefore the rate of flow of the fluid and the rate of feed of the drill or tool. This chamber 170 is shown diagrammatically in Fig. 25 as a port 170' to which is connected one end of a pipe or conduit 177 which has its other end connected with the pipe or conduit 137 from the lower end of the cylinder 100.

The valve block 166 is shown as provided with a port 178 between the valve block bores 167 and 168. This port 178 is diagrammatically illustrated in Fig. 25 as a pipe or conduit 179 connecting the valve bore 167 ahead of the valve member 172 with the bore 168 which contains the balance valve mechanism, indicated in general in Fig. 25 by the reference numeral 141.

The balance valve mechanism 141 is illustrated structurally in Fig. 16, and comprises a valve member 180 disposed in the valve bore 168 of valve block 166 and which valve member has reduced stem portions 181 and 182 at opposite ends thereof, together with a reduced central portion or cannelure 183. This reduced portion or cannelure controls the flow through a port, shown most clearly in Fig. 25 by the reference character 184, with which is connected the pipe or conduit 140. The valve block 166 is shown in Fig. 16 as having a second port 185 connecting the valve bores 167 and 168, this port being diagrammatically shown as a conduit 186 in Fig. 25, and connects the space ahead of the valve member 172 with the space ahead of the valve member 180. The space ahead of the valve member 180, including the reduced portion 182, includes a spring 187 which surrounds the said reduced valve portion 182 and abuts against the closure plate 169 for urging the valve member 180 to the right, as seen in Fig. 16, or downwardly as seen in Fig. 25, maintaining the port 184 normally open. As will be seen in Fig. 16, the fluid chamber 170 is at all times in communication with the end of the valve member 180, and this chamber is illustrated in Fig. 25 by means of a port 170" with which is connected one end of a pipe or conduit 188 which has its other end connected with the pipe or conduit 139.

The operation of the balance valve mechanism is well understood, its purpose being to maintain a constant flow of fluid through the system when the tool is being actuated through a slow or feeding cycle. This flow from the exhaust pipe or conduit 137 from the cylinder 100 is by way of the pipes or conduits 177 and 188 to the chamber 170 where it acts on the balance valve 180, for actuating it against the resistance of spring 187, and flows through the groove 173. The flow through the groove 173 is through the ports 178 and 185 respectively and pipes conduits 179 and 186. The flow through the port 185 or pipe or conduit 186 combines with the yieldable urge of the spring 187 for shifting the valve against the pressure in chamber 170 and therefore opening the port 184 an amount equal to the balance in pressure at the two ends of the valve as determined by the adjustment of the valve member 172. This flow through the port 184 is into the pipe or conduit 140 to the main control valve mechanism 115 where it is connected with the pipes or conduits 139 and 138 and the sump or tank 111.

The slow feeding movement of the tool continues until the tool carrier is reversed for withdrawing the tool from the work. The reversal of the tool carrier may be accomplished through either of two instrumentalities, either after a definite time of slow feed has taken place, or when the torque on the drill reaches a point near the safe torque load on the drill.

Since the torque drive to the spindle and its control have been previously described its connection with the operating mechanism will first be disclosed.

Within the switch housing 74 is a bridging contact, shown diagrammatically in Fig. 25 and indicated by the reference numeral 189. As shown in Fig. 25 the contact 77 has connected therewith the power lines 190 of an electrical supply, while the contact 78 has connected therewith a wire 192 connected with one end of the winding of the coil 193 of solenoid switch 194 and which coil has its other end connected by a wire 195 with the power line 191.

The solenoid switch 194, shown diagrammatically, in Fig. 25 comprises a core or switch stem 196 carrying bridging contacts 197 and 198. The bridge contact 197 is adapted to connect fixed contacts 199 and 200 respectively connected by a wire 201 with power line 190 and a wire 202 with one end of the coil 203 of solenoid 204. The bridge contact 198 is adapted to connect fixed contacts 205 and 206 respectively connected by a wire 207 with power line 191 and by a wire 208 with the other end the coil 203 of solenoid 204.

The solenoid 204, as seen in Fig. 10 is secured to the lower end of the spindle head plate 119 and has the core 209 thereof projecting therefrom. The upper end of the core 209 is pivotly connected at 210 with a link 211. The upper link 211 in turn, is pivotly connected at 212 with an extension 213 of the manually operating lever 142.

It should be noted that the spindle rotating or driving belt 36 is tensioned to the point of continuing drill rotation to at least, a point just short of drill breakage so that a slowing down in spindle rotation is caused by excessive torque on the drill. For this purpose the slack side of the belt has contacting therewith the idler or tensioning pulley or roller 214 rotatably mounted at the free end of an arm 215 oscillatably mounted on a stud 216 carried by an upstanding from the housing 30. Also mounted on the stud 216 and connected with the arm 215 is a segmental gear 217 having its teeth enmeshed with a worm 218 on the inner end of a worm shaft 219. The worm shaft 219 is rotatably journaled in suitable bearings provided by the housing 30 and which shaft 219 has secured to its projecting free end an operating knob 220.

From the foregoing it will now be seen that a slowing down of the spindle 42 due to an increase in torque on the drill or other tool which causes the closing of the switch contacts 77, 78 and 189 will operate the solenoid 204 and thereby shift the main control valve mechanism 115 to the right, as seen in Fig. 25, and effect thereby a rapid retraction of the piston 99 and parts carried thereby. It is believed obvious that the shifting of the main valve mechanism 115 will effect this operation since the pressure in pipe or conduit 114 will be connected with the pipe or conduit 137 and the under side of the piston 99. The exhaust fluid from the other side of the piston 99 flows through pipe or conduit 136 to the pipe or conduit 138 and the sump 111.

The rapid retraction of the spindle carrier and parts associated therewith continues until the carrier is reversed to again descend to work drilling position. The means and mechanism disclosed in the drawings for effecting this reversal includes a finger 221, secured to the lower end of the dog rod 153. The finger 221 has hingedly connected to it at 222 an arm 223 having upstanding from its free end an abutment pin 224, in the form of an adjustable screw, adapted to engage the lower end of a pin 225, illustrated most clearly in Figs. 10 and 24. The pin 225 is mounted in a cylindrical portion or housing 226, at the end of an arm 227 pinned or otherwise secured to an oscillatable dog rod 228 that may be termed a "reset" dog rod. The rod 228 is journaled for oscillation at its upper end in a bracket 229 carried by the spindle head plate 119, and is further journaled at its lower end in a bracket 230, likewise carried by the spindle head plate 119. As will be seen from Fig. 24, the housing 226 is provided at its lower end with a shoulder 231 on which rests an enlarged collar 232 of the pin 225. A coil spring 233 surrounds the pin 225 and abuts with the collar 232 for maintaining the pin 225 in its normal lower position. The normal position of the pin 225 is in line with the pin 224 and a valve actuating slide 234, the lower end 235 of which slide it engages during the upward movement of the spindle carrier for thereby upwardly shifting the said slide 234, as seen in Fig. 23.

The slide 234 is adapted to slide against the face 236 of the head plate 119 of the spindle head 101. The slide 234 is retained in position by a flange 237 projecting from the bracket 230 secured to the head plate 119. This slide 234 is provided intermediate its ends with rack teeth 239 meshing with a segmental gear 240, rotatably mounted on the bushing 146 carried by the spindle head plate 119.

The segmental gear 240 has projecting rearwardly therefrom an arm 241 provided at its rear end with a circular head 242 contracting on opposite sides thereof with valve stems 243 and 244. The valve stems 243 and 244 are associated with valve mechanisms which operate pistons for shifting the main control valve member 128, and these valve members are respectively shown diagrammatically in Fig. 25 where they are respectively indicated in general by the reference characters 245 and 246.

This upward movement of the valve slide 234, through its rack teeth 239, oscillates the arm 241 for shifting the valve stem 244 of valve mechanism 246. The valve mechanism 246, as noted above, is shown diagrammatically in Fig. 25 and is shown structurally in Fig. 15. The valve stem 244 has connected therewith a valve member 247 having intermediate its ends a reduced portion or cannelure 248. Below the cannelure 248, the valve stem 247 is provided with a counterbore in which is disposed one end of a coil spring 249, which has its other end seated in the counterbore of a plug 250 in the end of the bore in the valve block 135 which accommodates the valve 247. The valve member 247 is provided with a flange 251 to engage a shoulder 252 to limit the movement thereof by the spring 249.

As shown in Fig. 25, the reduced portion or cannelure 248 normally connects ports 253 and 254, and when operated by the arm 241, connects the ports 254 and 255. The port 255 has connected therewith one end of a branch pressure pipe or conduit 256, while the port 253 has connected therewith one end of a pipe or conduit 257, which terminate in the sump or tank 111. The remaining port 254 has connected therewith one end of a pipe or conduit 258, terminating at its other end in a cylinder 259. While the connection between the ports of the valve mechanism 246 is illustrated, in Fig. 25, as pipes or conduits, they are in fact merely cross-drilled ports in the valve block 135.

The cylinder 259 is in effect a cylindrical bore in valve block 135, has disposed therein a piston 260, engaging the undersurface of the valve shifter arm 147. The operation of the piston 260 shifts the main control valve 128 to its extreme left hand position, thereby connecting the pressure in the pipe or conduit 114 with the top of the cylinder 100 for actuating the piston 99 therein downwardly at a rapid rate. The fluid ahead of the piston 99 is forced through the pipe or conduit 137, to the main control valve 128, where it is connected with the pipes or conduits 138 and 139 and the sump or tank 111, thereby rapidly advancing the tool to the work.

From the foregoing, it will now be noted that the finger 221 through its pin 224 and the intermediate pin 225, reverses the movement of the tool carrier. It should be noted at this time that this reversal took place at a point short of the initial position of the tool carrier, and from which initial position the carrier was actuated by the initial operation of the lever 144, all as will be later made clear.

The rapid advance of the tool carrier 85 continues downwardly until the rapid traverse cumulative dog 154 through its nose 155 engages the flipper dog 161 and shifts the main control valve 128 to the slow feed position, whereupon, the tool carrier advances at a slow rate, as above described. This slow movement of the tool carrier continues until the torque control mechanism again withdraws the tool or until a definite time of tooling or drilling has taken place, for example one inch or more. In order to reverse the tool carrier and withdraw the drill from the work after a predetermined time of drilling has taken place, the following mechanism is employed.

Mounted in any convenient place on the machine, for example, on the column 29 is a standard or commercial electrical timer shown in Fig. 2 as a box at the upper end of the column 29 and indicated by the reference numeral 261. Since the electrical timer is a commercial product it is deemed unnecessary to further disclose this device structurally but it is diagrammatically illustrated in Fig. 25 and the essential parts thereof will be pointed out hereinafter.

As shown in Fig. 25 the timer comprises a switch including a bridging contact 262 adapted to connect fixed contacts 263 and 264. The fixed contact 263 has connected therewith one end of a wire 265 which has its other end connected with the torque switch fixed contact 77 and therefore the power line 190. The timer fixed contact 264 has connected therewith one end of a wire 266 which has its other end connected with the torque switch fixed contact 78 and therefore the control relay coil 193 and power line 191. The timer bridging contact 262 has extending therefrom a stem 267 which carries at its other end a piston 268 movable through a cylinder 269 which acts as a dash pot or retarding mechanism. The movable contact 262, its stem 267, and the piston 268 are moved by a spring 270 which acts on the said bridging contact 262. Extending from the cylinder 269 is an air outlet 271 having its outlet orifice adjustable by an adjusting screw 272. The adjusting screw 272 has at its inner end a valve which cooperates with the orifice 271 and is carried by a cap 273 having an outlet port 274 to atmosphere. Depending upon the adjustment of the adjusting screw valve 272 determines the amount of time that the piston 268 descends the cylinder 269 and therefore the time between successive closings of the bridging contact 262 and the fixed contacts 263 and 264 of the timer mechanism.

Associated with the timer switch stem 267 is a solenoid coil 275 having one end thereof connected by a wire 276 with the wire 195 and therefore the power line 191 while the other end of the coil 275 is connected by a wire 277 with a limit switch 278. The limit switch 278 includes fixed contacts 279 and 280 and a movable or bridging contact 281. It is with the contact 280 of the limit switch 278 that the wire 277 is connected while the fixed contact 279 has connected therewith a wire 282 which has its other end connected with the power line 190. The limit switch 278 is shown in Fig. 1 as a box secured to the side of the spindle head 101 and is adapted to be closed by a switch closing cam 283 on the side of the spindle carrier 85. The switch closing cam 283 engages and actuates an arm 284 to which the bridging contact 281 of the switch is connected. It will be understood that the arm 284 actuates the contact 281 against the resistence of a spring 285 illustrated in Fig. 25 as a coil spring.

It is believed that the operation of the electric timer is obvious since upon closing of the bridging contact 262 with the fixed contacts 263 and 264 the control relay coil 193 is energized thereby closing the same and energizing the solenoid 204 for shifting the main control valve 115 as above described to effect a rapid retraction of the tool from the work. Upon the tool carrier reaching its retracted position it closes the limit switch 278 thereby energizing the timer and at the same time deenergizing the relay switch solenoid coil 193. It should be noted that the resetting of the timer is at a rapid rate since no appreciable restriction is offered to the upward movement of the piston 268 as this will pull a check valve 286 from its seat and open an unrestricted port 287 into the cylinder 269.

It will be appreciated that the torque mechanism may operate within the time limits of the timer which may cause a retraction of the tool oftener than necessary or desirable since the timer may be about ready to operate when the torque control effected a reversal. It will be appreciated, however, that each time the spindle carrier is reversed it automatically resets the timer since the said spindle carrier is retracted to the same point whether this retraction is effected by the torque control or the electric timer.

After each rapid retraction of the tool carrier, whether caused by the torque control or the electric timer, the rapid downward movement of the carrier, and parts carried thereby continues until the cumulative stop dog, through its cam nose 155 again shifts the flipper 161 for slowing down the movement of the carrier to a feeding rate. The feed then continues until the drilling time, as established by the closing of the electric timer switch, has taken place, or until the torque on the drill reaches the point for substantially slowing down the rotation of the tool or drill spindle, so that the torque switch contacts close, whereupon the carrier is reversed to retract the tool from the work and effect a clearing of the chips from the hole being bored and a drenching of the tool or drill with coolant.

This cycle of operation is repeated continuously until the hole is completely bored through, whereupon the parts are returned to their initial position and the movement of the tool carrier stopped.

The mechanism for returning the carrier to its initial position, and stopping the mechanism, comprises a dog 288 (see Fig. 1), which has a shoulder 289 and is adjustably positioned in the T-slot 150 in the carrier. This dog 288 is adjusted to the point where it comes into operation after the work has been completely bored and engages an outwardly projecting arm 290 from the valve actuating slide 234 and causes a downward shifting thereof. This downward movement of the valve slide 234 through its rack teeth 239 rotates the segmental gear 240 to cause an upward oscillation of its arm 241 which through the enlarged ball end or circular head 242 thereof actuates the valve stem 243 of valve mechanism 245.

The valve mechanism 245 is illustrated structurally in Figs. 15 and 17 and comprises valve member 291 integral with the valve stem 243 which has a reduced portion or cannelure 292 intermediate the ends thereof. The valve member 291 is mounted in a bore in the valve block 118, which is provided with three ports 293, 294, and 295. The valve member 291 is adapted, when in the position shown, to connect the ports 294 and 295, and when in its second position, to cut off the port 295 and connect the ports 294 and 293. The valve is shifted to the position shown by means of a spring 296 disposed in a counterbore in the upper end of the valve member, having its other end seated in a counterbore in a plug 297 secured in the upper end of the valve bore. It should be noted at this time that the plug 297 is of a slightly greater diameter than the valve member 291, thereby providing a shoulder 298 against which an enlarged collar portion of the valve member 291 engages to limit the movement of the valve member by the spring 296. As seen in Fig. 25, the port 293 has connected therewith one end of a branch pressure pipe or conduit 299 which extends from the main pressure pipe or conduit 114, while the port 295 has connected therewith one end of a drain pipe or conduit 300, which terminates at the sump or tank 111. The remaining port 294 is illustrated in Fig. 25 as a pipe or conduit 301 and terminates in a cylinder 302. This cylinder is illustrated in Fig. 15 as a bore in which is mounted a piston 303 which has its lower end in contact with the upper surface of valve shifting arm 147.

From the foregoing it will now be seen that engagement of the dog 288 with the arm 290 of the slide 234 causes same to actuate the arm 241 and shift valve 291, thereby connecting pressure in the pressure line 114 through the pipe or conduit 299 and cannelure or reduced portion 292 with the pipe or conduit 301 and cylinder 302, for actuating the valve shifting arm 147 for shifting the main control valve member 128 to its extreme right hand position, seen in Fig. 25. The shifting of the valve member 128 to its right hand position connects the pressure in the pipe or conduit 114 with the pipe or conduit 137, thereby elevating the piston 99, and parts connected therewith, at a rapid rate. The fluid ahead of the piston 99 is exhausted by way of the pipe or conduit 136, main control valve 128 and pipe or conduit 138 to the sump or tank 111.

It should be here noted that during the slow or feed movement of the tool carrier the cumulative rapid traverse stop dog 154 is held stationary by engagement with the bracket 230 and that the frictional connection of the cumulative rapid traverse stop dog 154, with the dog rod 153 causes the said cumulative stop dog to move upwardly with the carrier and is therefore always positioned on the dog rod or bar 153 at a point where the previous slow movement or drilling of the work stopped.

In order to reset the cumulative stop dog after the completion of a drilling or tooling operation use is made of the cam dog 288 mounted in the spindle carrier slot 150 and which has integral therewith a cam dog nose 305 to come into operation at about the time the dog shoulder 289 operates or substantially immediately thereafter. The cam dog nose 305 is adapted to engage the end 306, see Fig. 22, of a short rack 307 mounted for transverse movement in the bracket 230. The rack 307 has its teeth 308 meshed with the teeth of a pinion 309, keyed or otherwise secured to the reset dog rod 228 which, as noted above, carries at its lower end the arm 227. This rod 228, in addition has secured thereto a resetting member or dog 310, see Figs. 10 and 21, having a lug 311 adapted to overlie a lug 312 projecting from the side of the cumulative rapid traverse stop dog 156.

When the tool or drill of the carrier has completely bored the hole being drilled, the cam dog nose 305 shifts the rack 307 outwardly, as seen in Fig. 22, or to the right, as seen in Fig. 1, thereby oscillating the rod 228. This oscillation of the rod 228 carried with it the arm 227 and removes the intermediate pin 225, carried by its outer end, from the path of movement of the dog pin 224, so that the upward movement of the valve actuating slide 234 cannot be effected. This then permits the carrier to travel beyond the point where it is normally reversed by the pin 224. The spindle carrier continues to the upper end of the piston cylinder 100 where it is retained by the hydraulic medium acting on the under surface of the piston 99 until the said spindle carrier is again manually started on a new drilling or tooling operation.

The oscillation of the rod 228, as above described, also shifts the resetting member or dog 310 to the position to cause the projection 311 to overlie the cumulative stop dog lug 312 and thereby hold the said dog relative to the dog bar or rod 153 during the final upward movement of the carrier, and thereby positioning the cumulative rapid traverse stop dog to its initial position for a subsequent operation of the machine. When the spindle carrier is again started on a new drilling or tooling operation the rod 228 is oscillated to its normal position by means to be presently described. This returning of the rod 228 is necessary to free the cumulative stop dog from its resetting member or dog 310, as well as to position the pin 225 for subsequently reversing the direction of movement of the tool carrier.

In order to hold the rod 228 in either of its two operative positions, it has keyed or otherwise secured to it, at a point below the bracket 230, a detent plate 313, provided in its one end with a pair of notches 314 and 315, which cooperate with a spring pressed detent 316. The detent member 316 is disposed in an enlarged bored portion 317 of the bracket 230 which contains a spring 318 abutting on its inner end with the detent 316, and on its outer end with a plug 319.

When it is desired to initiate a new drilling or tooling operation the lever 142 is actuated to shift the main control valve to its rapid advance position or the switch 144 is closed to energize the solenoid 143 and thereby actuate the main control valve 115. It will be seen from Figs. 2 and 25 that the solenoid 143 has its movable core 320 pivotly connected at 321 to a link 322 which has its other end pivotly connected at 212 with the lever extension 213.

Just before the cumulative stop dog 154 engages the flipper 161 for shifting the main control valve to its slow feed position the reset dog rod or bar 228 is oscillated to its normal operative position for freeing the said cumulative stop dog from the reset member or dog 310. This shifting of the reset dog rod or bar comprises a rockable dog 323 carried by dog carrier 304.

As seen in Fig. 26 the dog carrier 304 has formed diagonally thereof a way 324 somewhat wider than the rockable dog 323. The rockable dog 323 is pivotly mounted at 325 in the way 324 and is held in its normal position by a spring pressed plunger 326. The normal position of the rockable dog 323 is outwardly of the dog carrier 304 and its outermost end 327 acts as a cam.

The cam 327 is adapted to engage one side of a projecting lug or nose 328 of a shifter 329. The shifter 329 is pivoted at 330 intermediate its ends to the bracket 230 and is provided in its upper end with a slot 331. The slot 331 receives a pin 332 projecting from the rack 307.

It will be readily understood, that, as seen in Fig. 1, as the rockable dog 323 engages the shifter projection or nose 329 the said shifter is oscillated in a counterclockwise direction for shifting the rack 307 to the left, and thereby oscillating the reset dog rod or bar 228 for removing the projection 311 of the resetting member or dog 310 from the cumulative stop dog lug 312.

It should be noted that after the work has been completely drilled or bored and the spindle carrier is being returned to its initial position the shifter 329 has its projection or nose 328 in the path of movement of the rockable dog 323. No interference, however, with the operation of the machine is thus caused, because the rockable dog is actuated within the passage way 324 against the resistance of the spring plunger 326 by the shifter projection or nose 328 and the rockable dog is again immediately positioned in normal position for actuating the flipper 329 upon the next descent of the spindle carrier.

From the foregoing, it will now be appreciated that there has been provided a deep hole or step drilling machine, in which the tool is actuated through repeated cycles of a rapid movement toward the work, a slow movement through a portion of the work and a rapid movement from the work. The control of this cycle is dependent largely on the torque on the drill or tool during its operation, which control may be supplemented by means for periodically clearing the hole of chips to insure accuracy in drilling, and ultimate safety of the drill. It will be appreciated that the idle time of machines as heretofore known and used has been greatly reduced, while the mechanism is held to ultimate simplicity when considering the necessarily involved circuit.

What is claimed is:

1. In a drilling machine of the class described a spindle drive comprising a prime mover, a spindle, a driving sleeve splined to said spindle, means supporting said driving sleeve for rotation, a pulley freely rotatable on said sleeve, a power transmission member between the prime mover and sleeve pulley, a yieldable coupling between the pulley and sleeve for permitting continued pulley rotation while spindle rotation is retarded by torque thereon and automatically reestablishing spindle and pulley unitary rotation upon removal of torque on the spindle, including a plurality of driving dogs upstanding from said pulley, a rockable driven dog and cam member carried by the spindle driving sleeve in driving engagement with each of said pulley driving dogs, and a spring tension device for holding the said driven dog and cam members against rocking and in operative positions during normal torque on the spindle driving sleeve, a movable spindle carrier rotatably supporting the spindle from movement relative to the driving sleeve from a given point toward the work and from the work to said given point, a support for the spindle carrier and relative to which the spindle carrier moves, means moving said spindle carrier including an electromagnetically operated control member, means operable by said dog and cam members upon rocking thereof energizing the electromagnetically operated control member to retract the spindle carrier from the work, a switch comprising movable and fixed contacts connected with the electromagnetically operated control member operating the same independently of the operation thereof by the rocking of the driven dog and cam members, yielding means closing the movable and fixed contacts of said switch, and adjustable means controlling the operation of the yielding means so that a definite time limit is established for the movement of the spindle after the spindle carrier moves from its given point, said yieldable time controlled switch and rockable dog and cam members actuated means being so related as to independently operate the electromagnetically operated control member by whichever one is first energized.

2. In a drilling machine of the class described a spindle drive comprising a prime mover, a spindle, a driving sleeve splined to said spindle, means supporting said driving sleeve for rotation, a pulley freely rotatable on said sleeve, a power transmission member between the prime mover and sleeve pulley, a yieldable coupling between the pulley and sleeve for permitting continued pulley rotation while spindle rotation is retarded by torque thereon and automatically reestablishing spindle and pulley unitary rotation upon removal of torque on the spindle, including a plurality of driving dogs upstanding from said pulley, a rockable driven dog and cam member carried by the spindle driving sleeve in driving engagement with each of said pulley driving dogs, and a spring tension device for holding the said driven dog and cam members against rocking and in operative positions during normal torque on the spindle driving sleeve, a movable spindle carrier rotatably supporting the spindle for movement relative to the driving sleeve from a given point toward the work and from the work to said given point, a support for the spindle carrier and relative to which the spindle carrier moves, means moving said spindle carrier including an electromagnetically operated control member, means operable by said dog and cam members upon rocking thereof energizing the electromagnetically operated control member to retract the spindle carrier from the work, a switch comprising movable and fixed contacts connected with the electromagnetically operated control member operating the same independently of the operation thereof by the rocking of the driven dog and cam members, yielding means closing the movable and fixed contacts of said switch, adjustable means controlling the operation of the yielding means so that a definite time limit is established for the movement of the spindle after the spindle carrier moves from its given point, said yieldable time controlled switch and rockable dog and cam members actuated means being so related as to independently operate the electromagnetically operated control member by whichever one is first energized, means separating the movable and fixed contacts of the switch against the yielding closing means upon the retraction of the spindle carrier to its given point, and means carried by the spindle carrier operating the last named means.

3. In a drilling machine of the class described a spindle drive comprising a prime mover, a spindle, a driving sleeve splined to said spindle, means supporting said driving sleeve for rotation, a pulley freely rotatable on said sleeve, a power transmission member between the prime mover and sleeve pulley, a yieldable coupling between the pulley and sleeve for permitting continued pulley rotation while spindle rotation is retarded by torque thereon and automatically reestablishing spindle and pulley unitary rotation upon removal of torque on the spindle, including a plurality of driving dogs upstanding from said pulley, a rockable driven dog and cam member carried by the spindle driving sleeve in driving engagement with each of said pulley driving dogs, and a spring tension device for holding the said driven dog and cam members against rocking and in operative positions during normal torque on the spindle driving sleeve, a movable spindle carrier rotatably supporting the spindle for movement relative to the driving sleeve from a given point toward the work and from the work to said given point, a support for the spindle carrier and relative to which the spindle carrier moves, means moving said spindle carrier including an electromagnetically operated control member, means operable by said dog and cam members upon rocking thereof energizing the electromagnetically operated control member to retract the spindle carrier from the work, a switch comprising movable and fixed contacts connected with the electromagnetically operated control member operating the same independently of the operation thereof by the rocking of the driven dog and cam members, yielding means closing the movable and fixed contacts of said switch, adjustable means controlling the operation of the yielding means so that a definite time limit is established for the movement of the spindle after the spindle carrier moves from its given point, said yieldable time controlled switch and rockable dog and cam members actuated means being so related as to independently operate the electromagnetically operated control member by whichever one is first energized, means mounting the switch on the spindle carrier support adjacent the spindle carrier, means including a switch and solenoid separating the movable and fixed contacts of the switch against the yielding closing means upon retraction of the spindle carrier to its given point, and cam means carried by the spindle carrier for engaging and closing the switch.

4. In a drilling machine of the class described a spindle drive comprising a prime mover, a spindle, a driving sleeve splined to said spindle, means supporting said driving sleeve for rotation, a pulley freely rotatable on said sleeve, a power transmission member between the prime mover and sleeve pulley, a yieldable coupling between the pulley and sleeve for permitting continued pulley rotation while spindle rotation is retarded by torque thereon and automatically reestablishing spindle and pulley rotation upon removal of torque on the spindle including a displaceable member and a spring tension device for holding said member against displacement during normal torque on the spindle driving sleeve, a movable spindle carrier rotatably supporting the spindle for movement relative to the driving sleeve from a given point toward the work and from the work to said given point, a support for the spindle carrier and relative to which the spindle carrier moves, means moving said spindle carrier including an electromagnetically operated control member, means operable by said yieldable coupling displaceable member upon displacement energizing the electromagnetically operated control to retract the spindle carrier from the work, a switch comprising movable and fixed contacts connected with the electromagnetically operated control member operating same independently of the operation thereof by the yieldable coupling displaceable member, yielding means closing the movable and fixed contacts of said switch, and adjustable means controlling the operation of the yielding means so that a definite time limit is established for the movement of the spindle after the spindle carrier moves from its given point, said yieldable time controlled switch and yieldable coupling displaceable member actuated means being so related as to independently operate the electromagnetically operated control member by whichever one is first energized.

5. In a drilling machine of the class described a spindle drive comprising a prime mover, a spindle, a driving sleeve splined to said spindle, means supporting said driving sleeve for rotation, a pulley freely rotatable on said sleeve, a power transmission member between the prime mover and sleeve pulley, a yieldable coupling between the pulley and sleeve for permitting continued pulley rotation while spindle rotation is retarded by torque thereon and automatically reestablishing spindle and pulley rotation upon removal of torque on the spindle including a displaceable member and a spring tension device for holding said member against displacement during normal torque on the spindle driving sleeve, a movable spindle carrier rotatably supporting the spindle for movement relative to the driving sleeve from a given point toward the work and from the work to said given point, a support for the spindle carrier and relative to which the spindle carrier moves, means moving said spindle carrier including an electromagnetically operated control member, means operable by said yieldable coupling displaceable member upon displacement energizing the electromagnetically operated control member to retract the spindle carrier from the work, a switch comprising movable and fixed contacts connected with the electromagnetically operated control member operating same independently of the operation thereof by the yieldable coupling displaceable member, yielding means closing the movable and fixed contacts of said switch adjustable means controlling the operation of the yielding means so that a definite time limit is established for the movement of the spindle after the spindle carrier moves from its given point, said yieldable time controlled switch and yieldable coupling displaceable member actuated means being so related as to independently operate the electromagnetically operated control member by whichever one is first energized, means separating the movable and fixed contacts of the switch against the yielding closing means upon the retraction of the spindle carrier to its given point, and means carried by the spindle carrier operating the last named means.

6. In a drilling machine of the class described a spindle drive comprising a prime mover, a spindle, a driving sleeve splined to said spindle, means supporting said driving sleeve for rotation, a pulley freely rotatable on said sleeve, a power transmission member between the prime mover and sleeve pulley, a yieldable coupling between the pulley and sleeve for permitting continued pulley rotation while spindle rotation is retarded by torque thereon and automatically reestablishing spindle and pulley rotation upon removal of torque on the spindle including a displaceable member and a spring tension device for holding said member against displacement during normal torque on the spindle driving sleeve, a movable spindle carrier rotatably supporting the spindle for movement relative to the driving sleeve from a given point toward the work and from the work to said given point, a support for the spindle carrier and relative to which the spindle carrier moves, means moving said spindle carrier including an electromagnetically operated control member, means operable by said yieldable coupling displaceable member upon displacement energizing the electromagnetically operated control member to retract the spindle carrier from the work, a switch comprising movable and fixed contacts connected with the electromagnetically operated control member operating same independently of the operation thereof by the yieldably coupling displaceable member, yielding means closing the movable and fixed contacts of said switch, adjustable means controlling the operation of the yielding means so that a definite time limit is established for the movement of the spindle after the spindle carrier moves from its given point, said yieldable time controlled switch and yieldable coupling displaceable member actuated means being so related as to independently operate the electromagnetically operated control member by whichever one is first energized, means mounting the switch on the spindle carrier support adjacent the spindle carrier, means including a switch and solenoid separating the movable and fixed contacts of the switch against the yielding closing means upon retraction of the spindle carrier to its given point, and cam means carried by the spindle carrier for engaging and closing the switch.

JOHN E. SHRIVER.

REFERENCES CITED

The following references are of record in the file of this patent:

UNITED STATES PATENTS

| Number | Name | Date |
|---|---|---|
| 2,079,640 | Vickers et al. | May 11, 1937 |
| 2,260,327 | McKee | Oct. 28, 1941 |
| 2,324,727 | Shartle | July 20, 1943 |
| 2,418,220 | Churchill | Apr. 1, 1947 |